US011772297B2

(12) United States Patent
Klein et al.

(10) Patent No.: US 11,772,297 B2
(45) Date of Patent: Oct. 3, 2023

(54) ADJUSTABLE FEATHERBOARD

(71) Applicant: MAGSWITCH TECHNOLOGY WORLDWIDE PTY LTD, Lafayette, CO (US)

(72) Inventors: Andrew Klein, Parker, CO (US); David Long, Golden, CO (US)

(73) Assignee: MAGSWITCH TECHNOLOGY, INC., Superior, CO (US)

( * ) Notice: Subject to any disclaimer, the term of this patent is extended or adjusted under 35 U.S.C. 154(b) by 120 days.

(21) Appl. No.: 17/102,580

(22) Filed: Nov. 24, 2020

(65) Prior Publication Data

US 2021/0154881 A1    May 27, 2021

Related U.S. Application Data

(60) Provisional application No. 62/940,134, filed on Nov. 25, 2019.

(51) Int. Cl.
| | | |
|---|---|---|
| *B27C 5/06* | (2006.01) | |
| *B23D 47/04* | (2006.01) | |
| *B27B 25/10* | (2006.01) | |

(52) U.S. Cl.
CPC .............. *B27C 5/06* (2013.01); *B23D 47/045* (2013.01); *B27B 25/10* (2013.01)

(58) Field of Classification Search
CPC .... B27C 5/02; B27C 5/04; B27C 5/06; B27B 25/06; B27B 25/08; B27B 25/10; B23D 47/04; B23D 47/045
See application file for complete search history.

(56) References Cited

U.S. PATENT DOCUMENTS

| | | |
|---|---|---|
| 7,735,237 B1 | 6/2010 | Moon |
| 7,942,174 B2 | 5/2011 | Kozina et al. |

(Continued)

FOREIGN PATENT DOCUMENTS

WO    2010020006 A1    2/2010

OTHER PUBLICATIONS

Highland Woodworking, MagSwitch Starter Kit and Featherboard Woodworking Magnetic Jigs, Mar. 8, 2016, https://www.youtube.com/watch?v=AI9QYfJrbP0 (Year: 2016).*

(Continued)

*Primary Examiner* — Matthew Katcoff
(74) *Attorney, Agent, or Firm* — Faegre Drinker Biddle & Reath LLP

(57) ABSTRACT

The present invention relates to improvements in a magnetic featherboard, the featherboard having an elongate main body with opposite lateral faces, a bottom face and front and rear faces; a plurality of resiliently deformable feathers arranged at one or both lateral faces of the main body, and at least two, on-off switchable permanent magnets respectively received in one of at least two spaced apart recesses of the main body such that a working face of the respective switchable permanent magnet is present at the bottom face of the main body. One improvement comprises (i) providing a resiliently deformable friction gasket adjacent the working face of each of the switchable permanent magnets and protruding, in an non-deformed state, a predetermined amount from the bottom face of the main body and the working faces, the gaskets deformable through magnetic clamping of the featherboard to a table. The other improvement resides in providing at least two adjustable stops at one or both of the front and the rear face of the main body, each said stop comprising an abutment piece displaceable in longitudinal direction relative to the front/rear face, wherein (Continued)

a distance of each of the abutment pieces from the front/rear face is settable independently of each other, the stops operational to provide at least two abutments against which stock material to be machined can be placed when the featherboard is magnetically secured to the table.

15 Claims, 5 Drawing Sheets

(56) References Cited

U.S. PATENT DOCUMENTS

| | | | |
|---|---|---|---|
| 8,763,502 B2* | 7/2014 | Smith | B27B 25/10 83/13 |
| 10,843,281 B2* | 11/2020 | Bow | B23Q 3/002 |
| 2003/0140754 A1 | 7/2003 | Kimmel et al. | |
| 2019/0240747 A1 | 8/2019 | Bow | |

OTHER PUBLICATIONS

Magswitch: "Woodworking"; from https://magswitch.com/wp-content/uploads/2019/05/Woodworking-Brochure-1.pdf; May 31, 2019.
European Patent Office; European Extended Search Report; EP Application No. 20209575.8; 13 pages, dated Jun. 30, 2021.

* cited by examiner

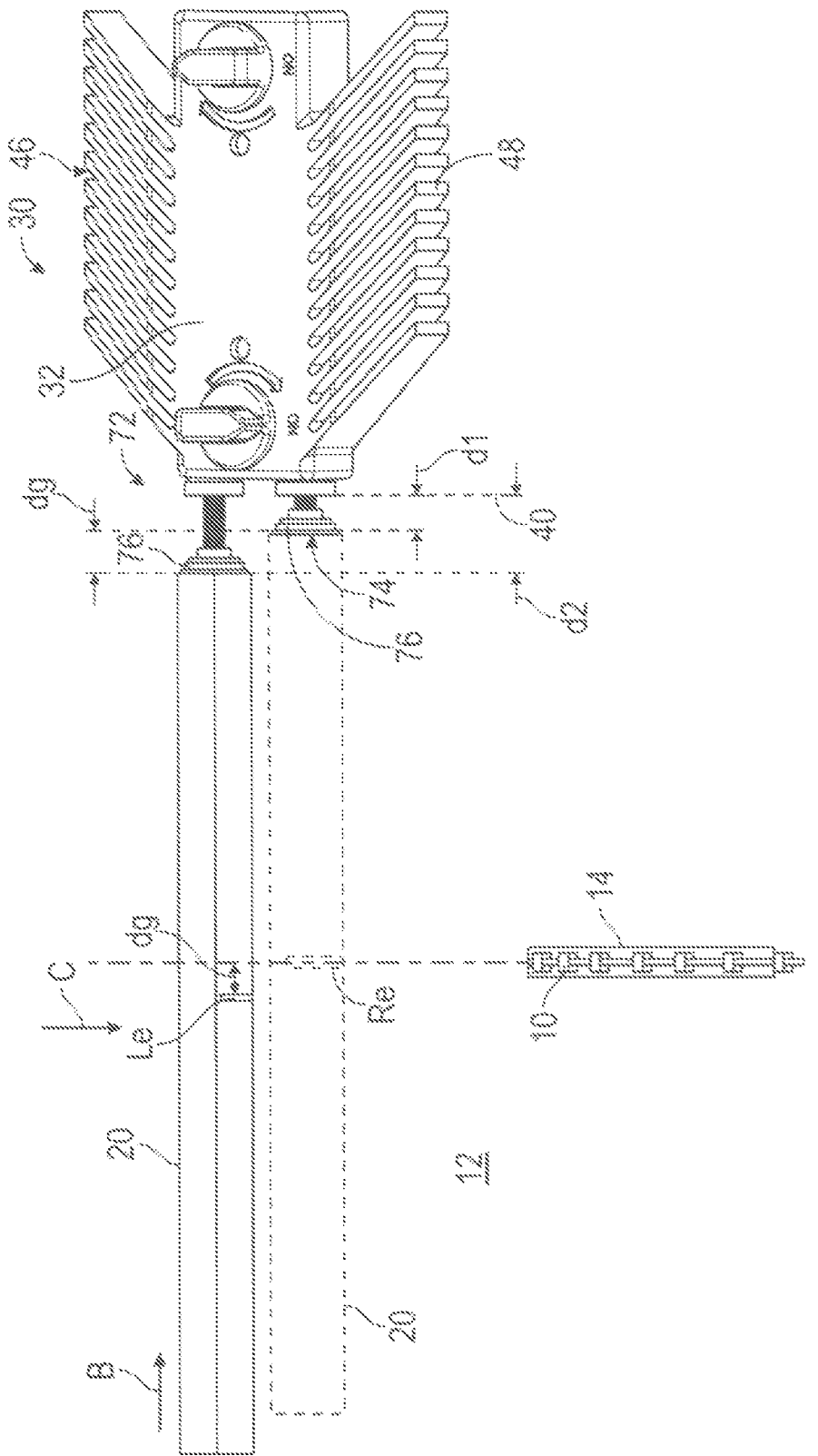

ADJUSTABLE FEATHERBOARD

FIELD OF THE INVENTION

The present invention relates to accessories for use with table saws, router tables, jointer tables, shaper tables, band saw tables and similar stock cutting machines, and more particularly, to accessories which may be mounted directly to a machining table to guide and or hold stock during cutting, routing, etc.

BACKGROUND TO THE INVENTION

Prior art of the invention will be described in the context of a typical table saw. However, the skilled person will appreciate that the below described inventive accessory can be used in other applications involving machining of stock material, such as wood or plastic, supported on a steel or other table having ferromagnetic properties.

A table saw, such as for example schematically illustrated in U.S. Pat. No. 7,942,174 and FIG. 1 herein, typically consists of a motor-driven circular saw blade 10 centrally mounted beneath a horizontal, substantially flat saw table 12 having a blade slot 14 through which the saw blade 10 protrudes. At least one miter slot/groove 16/17 is formed in the stock-support surface s of the metallic saw table 12 on either side of the saw blade slot 14, oriented parallel to the saw blade and blade slot and extending the length of the saw table. T-Miter slot(s) 16 and other grooves 17 is/are sized to receive and secure table saw accessories such as a miter gauge, which is used for cross cutting and mitering operations, guide fences 18, stop blocks, etc. Whilst attempts have been made to standardize the width of in particular T-miter slots at 0.75 inch (19 mm) and depth at 0.375 in (9.5 mm), different manufacturers of such machinery often use customized sizes (thereby making interoperability of accessories on work tables of different manufacturers difficult at best).

A table saw also typically includes a (rip) fence 18, an elongated bar which is oriented parallel to the saw blade 10 and is adjustably fixed to the saw table by means such as clamps (not shown) which engage opposing edges of the saw table 12. Other accessories such as guide blocks and abutment stops may include a Tenon by way of which these can be located on the table 12 using available miter slots or other grooves machined into the table top surface s; rip fences normally do not have such fixed guide elements that cooperate with grooves on the table, and FIG. 1 only includes this feature for illustrative purposes. The fence 18 illustrated can be used for ripping and dadoing, or as a simple guide, stop, support or jig for other operations and, relevantly, as a support other accessories as illustrated and explained below.

To perform a ripping operation, which is the sawing of a length of stock 20, eg a wooden board, usually in a longitudinal direction with the grain of the wood, a featherboard 22 is often used in combination with the rip fence 18. In use, the featherboard 22 is first positioned on the saw table 12 upstream of the saw blade 10 (when viewed in stock feeding direction A as illustrated) and so that its sideways protruding, resilient inclined fingers 24 (feathers) point toward the saw blade 10 and terminate a distance from the rip fence 18 slightly less than the width w of the stock 20 to be cut. The featherboard 22 is then secured to the saw table 12 as noted below.

In performing the ripping operation, the stock 20 is pushed by the operator as per arrow A in FIG. 1 toward the blade 10 of the saw. The stock 20 is guided on one side at the rip fence 18 and supported on the table 12. The stock 20 passes between the featherboard 22 and the rip fence 18, slightly bending the resilient feathers 24 which thus press the stock 20 against the rip fence 18, thereby holding the stock 20 against the rip fence 18 and preventing it from drifting away from the fence 18 during the cutting operation. By holding the stock 20 firmly against the rip fence 18 as it passes across the saw blade 10, a straight cut will be achieved, and the danger of the stock 20 becoming skewed relative to the saw blade 10 is greatly reduced Fixing/securing of the featherboard 22 to the saw table 12 can be effected using separate conventional c-clamps, or as shown in FIG. 1, using clamping T-screws 26 supported at the featherboard 22 and whose T-heads are received in the T-cross-sectioned miter slots (also at times referred to as tracks) 16 of the saw table 12. In the prior art featherboard of FIG. 1, to allow a degree of positional adjustment of the featherboard 22 vis a vis the rip fence 18, stock material 20 and miter slot 16, the T-screws 26 are received in through slots 28 formed in the featherboard's main body.

FIG. 1 further illustrates how a featherboard 22 can also be used as a push-down accessory to prevent in particular thin stock materials (eg wood sheets) from flattering during a sawing/ripping operation. In the example illustrated, the rip fence 18 has a T-groove 16 similar to those present in the saw table 12 to allow fastening of a vertically orientated featherboard 22 with the featherboard fingers 24 resiliently pushing down on the stock 20 in adjustable manner.

For a number of years, magnetic featherboards have also been available, for example from Magswitch Technology Inc., of Lafayette, Colo. USA, under the name Magswitch Pro Table Featherboard 8110328 and Magswitch Universal Featherboard 8110015. These featherboards utilize switchable permanent magnets to positionally locate and magnetically clamp the featherboard to the saw table, instead of mechanical fasters. This clamping methodology allows greater freedom as regards positional placement of featherboards on the table when compared with featherboard designs which rely on the miter tracks of the table to locate and positionally fix the featherboard using integrated clamping screws, as per the prior art illustrated in FIG. 1.

Given their versatility and freedom of locational placement on the table, Magswitch featherboards are also increasingly used as stop-blocks or miniature fences, eg when performing crosscuts in stock material. In these uses, the feathers perform no function, rather one of the opposite ends of the main body from which the feathers protrude serve as a measuring stop.

It is an object of the present invention to improve on existing magnetic featherboard designs, by providing increased versatility of use of the same accessory in performing stock machining operations such as cutting, routing etc., on a support table.

It is another, separate object of the present invention to improve existing magnetic featherboards intended for use on a ferromagnetic table of machines such as table saws, table routers, etc., which have one or more miter slots in the otherwise planar table surface, as regards clamping force exertion.

SUMMARY OF THE INVENTION

In a first aspect, the present invention provides an improvement in a magnetic featherboard, the featherboard having an elongate main body with opposite lateral faces, a bottom face and front and rear faces; a plurality of resiliently deformable feathers arranged at one or both lateral faces of the main body, the feathers extending parallel to each other and angularly with respect to a longitudinal axis of the main body; and at least two, on-off switchable permanent magnets respectively received in one of at least two spaced apart recesses of the main body such that a working face of the respective switchable permanent magnet is present at the bottom face of the main body, the switchable permanent magnets being operative in an on-state to magnetically clamp the featherboard to a support table or a fence of a machine for cutting, routing or performing similar material-removing operations on stock material, the support table/fence having at least one groove formed in a stock-facing surface thereof, the improvement comprising (i) providing a resiliently deformable friction gasket adjacent the working face of each of the switchable permanent magnets and protruding, in an non-deformed state, a predetermined amount from the bottom face of the main body and the working faces to stand the featherboard on the stock-facing surface of the table/fence, the gaskets deformable through magnetic clamping of the featherboard to the table/fence to an extent wherein abutment of the working faces of the switchable permanent magnets on the stock-facing surface of the table or fence is achieved whilst maintaining gasket engagement at the stock-facing surface, and (ii) selecting a shape and dimensions of the working face of the switchable permanent magnets to have a surface area that is larger by a predetermined amount than the square value of a width of the at least one groove formed in the stock-supporting surface of the support table/fence.

The two measures (i) and (ii) work together to increase clamping force of the featherboard when placed on the stock-supporting surface of the table (or fence) in such location where one or both of the working faces of the switchable permanent magnets come to lie directly above the at least one miter groove, and increase frictional resistance (between friction gaskets and stock-supporting surface) against displacement of the featherboard when under shear loads during a stock cutting operation.

Preferably, the friction gaskets are shaped to fully surround the working faces of the switchable permanent magnets. The working faces may have a circular, oval or other configuration, but are preferably rectangular.

However, it is equally foreseen to have discrete gasket bodies present either on one or on two opposite edges of the working face of the switchable permanent magnets to achieve a desired degree of improved shear resistance when compared with embodiments where no such friction gaskets are present.

Advantageously, the shape and/or specific dimensions of the working face of the switchable permanent magnets is chosen such that the working face area is at least 50%, but preferably 100% larger than the square of the width of the miter slot of the machine table/fence on which the featherboard is intended to be used. This ensures that a sufficiently large magnetic interaction area between magnets and machine table/fence is maintained regardless of how the featherboard is placed on the table over a miter slot, to secure the featherboard via the working faces of the magnets against displacement under typical loads encountered during a stock machining operation.

Using a so-called standard 19×9.5 mm T-miter slot as a an example and a 50% minimum additional surface area, the attachment face will be chosen to have an area of 541 mm$^2$, which using a rectangular attachment face embodiment would equate to an area of approximately 18 mm×30 mm. Preferably, however, in the case of rectangular-shaped attachment faces, the minimum dimension could be chosen to be about the same as or bigger than the slot width, which would then lead to a 19 mm×28.5 mm magnet attachment face area embodiment.

In a second aspect, the present invention provides an improvement in a magnetic featherboard, the featherboard having an elongate main body with opposite lateral faces, a bottom face and front and rear faces; a plurality of resiliently deformable feathers arranged at one or both lateral faces of the main body, the feathers extending parallel to each other and angularly with respect to a longitudinal axis of the main body; and at least two, on-off switchable permanent magnets respectively received in spaced apart recesses of the main body such that a working face of the respective switchable permanent magnet is present at the bottom face of the main body, the switchable permanent magnets being operative in an on-state to magnetically clamp the featherboard to a support table or a fence of a machine for cutting, routing or performing similar material-removing operations from stock material, the improvement comprising at least two adjustable stops at one or both of the front and rear faces of the main body, each said stop comprising an abutment piece displaceable in longitudinal direction relative to the front or rear face, wherein a distance of each abutment piece from the front or rear face is settable (fixable) independently of each other, the stops operative in providing two abutments against which a same or different stock material to be machined can be placed when the featherboard is magnetically secured to the table.

The two abutment stops at the featherboard can be adjusted whilst the featherboard remains magnetically clamped to the (eg saw) table, ie the operation does not require dislodgement of the accessory from the table. This allows faster and accurate adjustments to be made at the accessory when cutting grooves/slots in a crosscutting operation, without a need to re-measure.

Preferably, the two adjustable stops comprise each a spindle member at one terminal end of which the abutment piece is carried, the spindle member having an externally threaded distal portion and a non-threaded proximal portion with a guide element. Each spindle is received in a respective passageway at the main body, with the guide block disposed to cooperate with a counter element which allows to and fro movement whilst restraining rotation of the spindle during said to and fro movement. To move the spindle, an adjustment member is used, threaded to the threaded distal portion of the spindle and secured in a manner which allows rotation of the adjustment member about the spindle axis but prevents axial displacement along the spindle and with respect to the front/rear face. Selective rotation of the adjustment member serves to change a distance by which the abutment piece stands proud from the front/rear face.

In one embodiment, the spindle comprises a square-head bolt, with the head providing the guide element, and a bearing element, advantageously an Ingus JSM bearing sleeve, securing axially-unrestricted movement and support of the bolt's proximal portion at the main body. A helical compression spring locates between the Ingus bearing and a rearward facing face of the adjustment member (eg knurled thumb nut or a simple domed hexagonal nut) in order to restrict axial movement of the adjustment member as it is rotated.

Preferably, the cooperating thread of the spindle and adjustment member are chosen in a manner whereby one full 360° turn of the adjustment member equates with a specific linear distance travelled by the associated abutment piece, eg 1 full rotation equates to 0.4 mm axial displacement. This allows the two stops to be individually micro-adjusted to provide separate stops for repeatable crosscut sawing operations on stock material and precise cutting of slots of a desired width in a same stock material, without a need to separately measure for correct slot-width and re-adjustment of a single stop element.

In a third aspect, the present invention relates to an improved featherboard that comprises the improvements according to the first and second aspect of the invention.

In the following, a single embodiment of the invention will be described with reference to the accompanying drawings, whereby the skilled person will appreciate that variations from the specifically depicted components of the improved featherboard are possible without departing from the gist of the various aspects of the invention embodied in the illustrated featherboard.

BRIEF DESCRIPTION OF THE DRAWINGS

FIG. 5 is a schematic illustration showing how a groove can be formed in a single square-section wood beam using the featherboard of FIG. 2 by virtue of the two adjustable stops provided on a front face of the featherboard.

DESCRIPTION OF PREFERRED EMBODIMENT

The present invention is concerned with improvements to existing featherboard designs, in particular featherboards with a magnetic clamping mechanism. Noting that FIG. 1 has already been referred to in the introductory part of this specification in describing nature and use of featherboards generally, the skilled person can notionally exchange the prior art featherboard 22 illustrated in FIG. 1 with the featherboard 30 described below with reference to FIGS. 2 to 5, in performing timber stock machining/cutting operation as previously described, with the added benefits which the use of magnetic featherboards entail as regards of freedom of positional placement on the machine table 12 and fixing of such position without the need to cooperate with existing miter slots 16/17.

Figure 2:
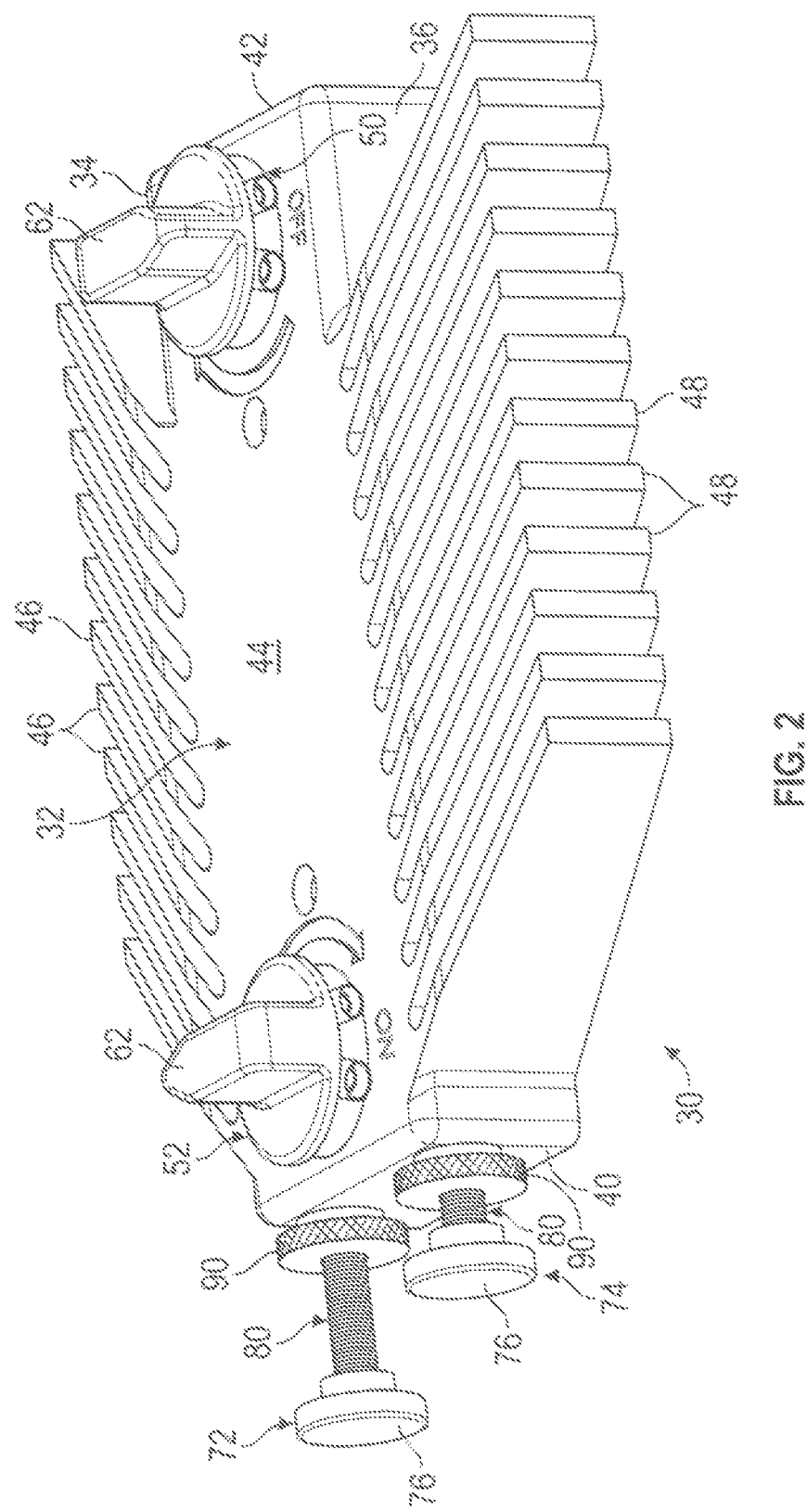
FIG. 2 is a perspective view from above a featherboard embodying various improvements proposed by the present invention.
Figure 3:
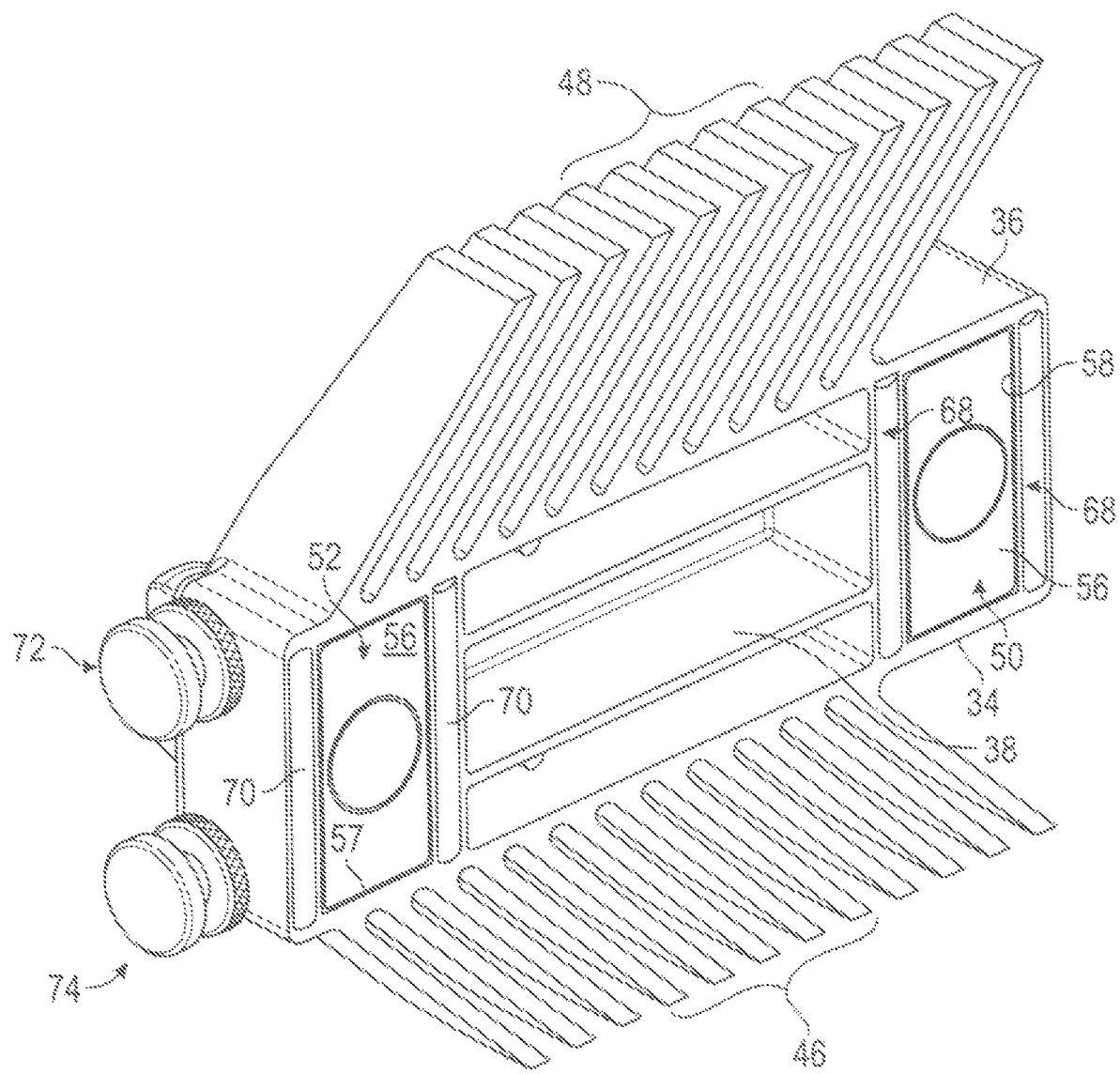
FIG. 3 is a perspective view, from below, of the featherboard of FIG. 2.
Figure 4:
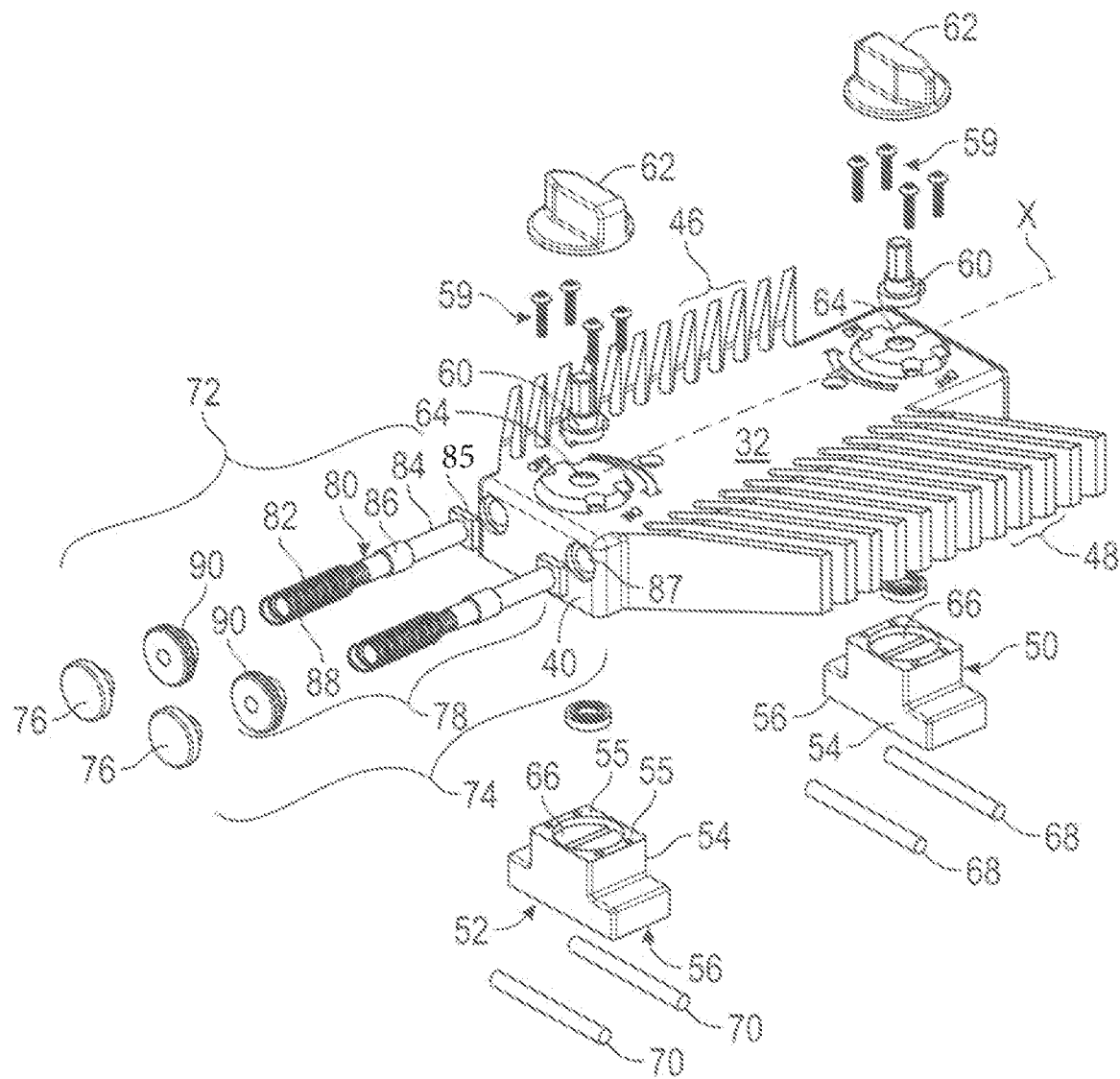
FIG. 4 is a perspective exploded view of the featherboard of FIG. 2 showing its constituent components.

Referring then to FIGS. 2 to 4, the improved featherboard 30 includes a main elongate body 32 cast from a suitable hard/wear-resistant plastic material, such as ABS or reinforced nylon or similar polymer, defining a rigid box-like, preferably partially hollow structure with internal webs joining external front, rear, side and top body walls. Body 32 has parallel opposite lateral faces 34, 36, a discontinuous bottom face 38, planar front and rear faces 40 and 42 and a substantially closed top face 44 on which two, rotatable actuator knobs 62 stand proud on longitudinally opposite ends of the featherboard 30.

Twelve resiliently flexible fingers (ie feathers 46, 48) are integral with and cantilevered on both lateral faces 34, 36 of elongate body 32, the plurality of feathers 46 and 48 on each lateral face 34, 36 and extending parallel to each other with small spacing between them. It will be seen that the feathers 46 on side face 34 are angularly inclined (counting counter-clockwise along a longitudinal axis X of elongate body 32 in direction from rear to front face) at between 45 and 80 degrees (typically 65 to 75 degrees) with respect to longitudinal axis X, and the feathers 48 on side face 36 are inclined by the same angular value but counted clockwise. In other words, a featherboard 30 design is provided which enables it to be deployed on both sides of a saw blade in performing its feathering function as was described with reference to FIG. 1.

For example, the featherboard may comprise an elongate main (or central) body portion 32 with a length of 175 mm between front and rear terminal faces 40, 42, a width of 40 mm between opposite lateral faces 34, 36 (ie excluding the plurality of elastically deformable feathers/fingers 46, 48 which would be typically angled 60° with respect the longitudinal axis X of the featherboard and protrude another 30-35 mm from both side faces), and have a height of 55 mm.

As best seen in FIGS. 3 and 4, featherboard 30 has two, on-off switchable permanent magnet units 50, 52 fittingly locating in rectangular cavities 57, 58 respectively formed near the front and rear longitudinal ends of central body portion 32, the cavities 57, 58 being open towards the bottom face 38. The on-off switchable permanent magnets 50, 52 are, the illustrated embodiment, modified AR20-type switchable permanent magnet units as manufactured and sold by the applicant; for more information about magnetic specifications please access http://www.magswitch.com. One modification associated with the proposed improvement resides in a modified, T-stepped housing 54 which is comprised of two, opposite polarizable, appropriately machined pole shoes which provide an enlarged magnetic pole footprint area (ie at the working gap face 56 of a magnet unit 50, 52; see FIG. 3) as compared with a traditional rectangular box-shaped, non-stepped housing. As will be noted, the footprint area here substantially takes up the entire width (minus sidewall thickness) of the central body 32 of featherboard 30, ie approximately 36 mm using the dimensions noted above. Each magnet unit 50, 52 has an extension (in longitudinal axis direction) of around 15 mm. These dimensions are exemplary only. One improvement vs Magswitch's existing Magnetic Universal Featherboard Model 8110015 resides in the substantially enlarged working face area 56 provided by and at the terminal ends of the pole pieces of the housing 54, without reducing magnet holding force to any detrimental extent.

Each magnet unit 50, 52 is secured inside the respective cavity 58 using four M3x05x12 BHSCS screws 59 which extend through respective through holes in the top face wall of central body part 32 and locate in threaded bores 55 on an upper face of T-shaped housing 54. A rotatable torque plunger 60 is rotationally fixed to actuator knob 62 and extends through another through hole 64 in the top face of elongate main body 32 to engage and mechanically couple with an upper, rotatable cylindrical, permanent magnet 66 of magnet unit 50, 52, thereby allowing torque transmission to rotatable magnet 66 upon rotation of knob 62 to turn-on and turn-off the magnet units 50, 52, and thereby magnetically fix/attach/clamp (and release the engagement of) the featherboard 30 to/from the table of the table saw (as per FIG. 5).

Referring again to FIGS. 3 and 4, it will be noted that a respective tubular (cylindrical) compressible gasket rod 68, 70 locates and is fixed (eg glued) in a respective one of four grooves (not illustrated in detail) extending between the side faces 34, 36 in the bottom face 38 adjacent a front and rear edge of each cavity 58 in which the magnet units 50, 52 are received. The rods 68, 70 have a diameter that ensures, when snuggly fitted into the respective grooves, the rods 68, 70 protrude and stand proud of the plane defined at the bottom face 38 of central main body part 32. On the other hand, the rods are made of a friction-enhancing, compressible rubber material, and are compressible to an extent that when fully compressed into the respective grooves, they no longer stand proud, but create a substantially continuous planar surface with the working face 56 of magnet units 50, 52 when the latter are turned into the on (magnetized) state when the featherboard 30 is received on a saw table 12, thereby enabling magnetic coupling/clamping of the featherboard 30 to the support table 12 of the saw table 12. The gasket rods 68, 70 provide friction enhanced grip between featherboard 30 and the surface of the support table 12, beyond the magnetically induced Normal force securing the magnets (at working gap face 56) to the saw table 12.

Figure 1:
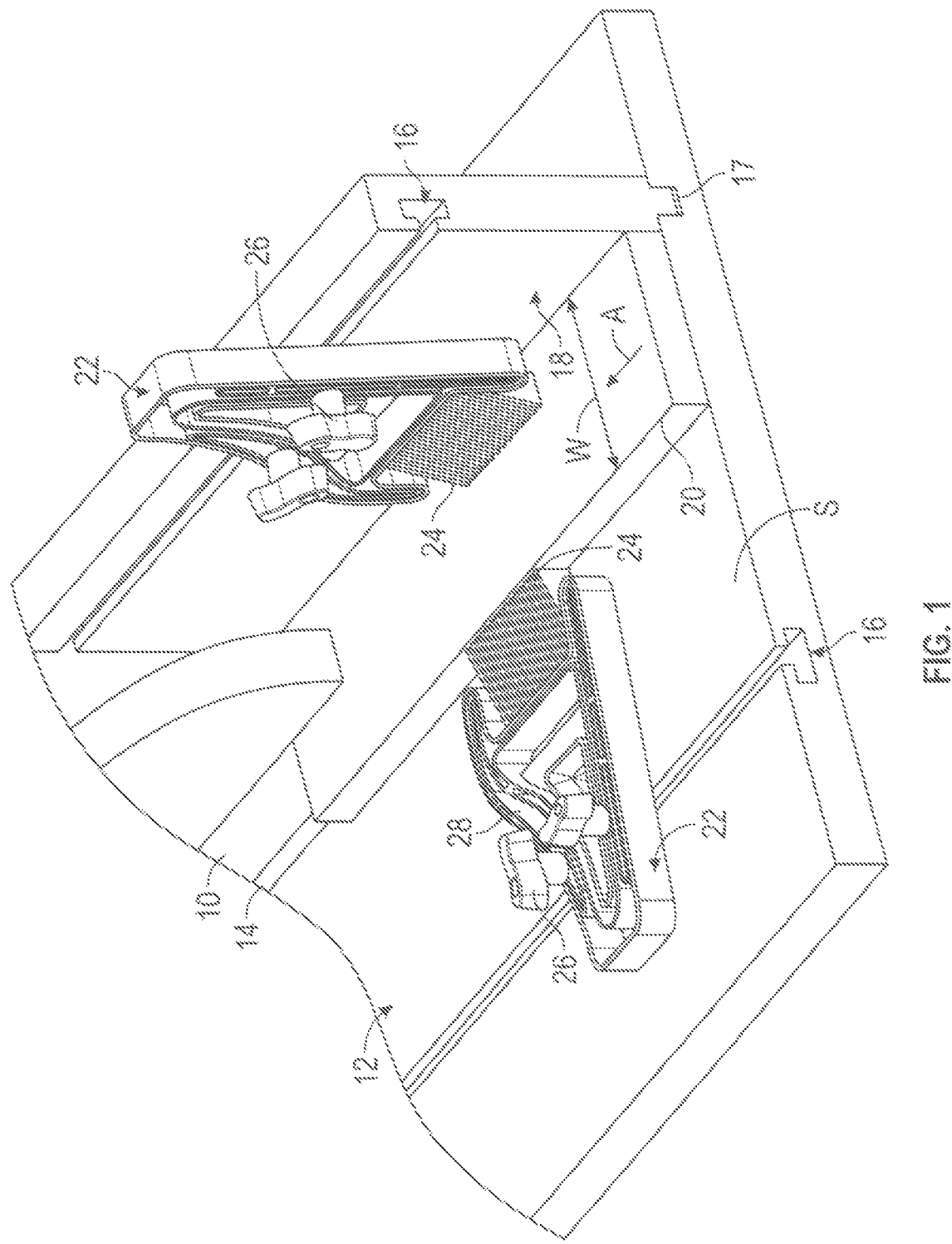
FIG. 1 is a schematic and perspective view of a featherboard, as per the prior art, illustrated in use on a table saw.

Turning next to FIGS. 2 to 5, a further functional improvement is made to featherboard 30 by providing at its front face 40 two independently adjustable abutment stops 72, 74 that are constructionally identical to one another and which telescope in retractable manner parallel to one another along the longitudinal axis X of the main body part 32. The stops 72, 74 provide separate abutments/distance stops against which stock material 20 to be machined can be placed when the featherboard 30 is magnetically secured to the surface s of the saw table 12, as may be gleaned from the schematic illustration of FIG. 5, when performing cross-cut operations on timber (or plastic/aluminum) stock material, eg when cutting a notch or groove in the stock material 20. A cross-cut is normally defined as a cut wherein the plane of a cut is perpendicular or inclined with respect to a main extension of a stock material when pushed as per arrow B against a stop, as compared to eg rip cut, where the cut plane is parallel with a guide fence along which stock material is fed, as illustrated in FIG. 1 by arrow A.

Each stop 72, 74 includes an abutment piece 76 comprised of a peripherally knurled disc portion and a central hub portion having an internal thread. Each abutment piece 76 is held displaceable in longitudinal direction relative to the front face 40. The spacing (axial distance d1, d2) of each abutment piece 76 from the front face 40 is settable independently of each other using a respective drive spindle arrangement. 78. The latter comprises a spindle member 80 (see FIG. 4) having an externally threaded distal portion 82 and a non-threaded proximal portion 84 with a rotation-inhibiting guide element 85. The abutment piece 76 is threaded onto the terminal end of threaded spindle portion 82.

The spindle member 80 is received through opening 87 in front face 40 in a respective passageway at the main elongate body 32, with the guide element 85 cooperating with a counterpart guide structure within main body part 32 to allow to and fro movement whilst restraining rotation of the spindle member 80 during said to and fro movement.

Each drive spindle arrangement. 78 further comprises a rotatable distance adjustment member in form of a knurled thumb nut 90 threaded onto the threaded distal portion 82 of the spindle 80, and secured in a manner which allows rotation of the thumb nut 90 about the spindle but prevents axial displacement along the spindle axis and with respect to the front face 40. To this end, a collard bearing sleeve 86 is secured in through hole 87 and provides support of the spindle's proximal (smooth) portion 84 at the main elongate body 32, whilst a helical compression spring 88 locates about the distal, threaded portion 82 between the bearing 86 and a rearward facing side of the adjustment thumb nut 90 in order to restrict axial movement of the adjustment member 90 during manual rotation to change a distance d1, d2 by which the abutment piece 76 stands proud from the front face 40.

In the embodiment illustrated, the spindle 80 is provided by a square-head bolt, with the head providing the rotation restricting guide element 85 of the spindle.

The cooperating threaded portion 82 of the spindle 80 and adjustment member 90 are chosen in a manner whereby one full 360° turn of the adjustment member 90 equates with a specific linear distance travelled by the associated abutment piece, eg one full rotation equates with 0.4 mm displacement, but any suitable thread pitch may be chosen. This allows the two stops 72, 74 to be individually micro-adjusted to provide separate stops for repeatable cross-cut sawing operations on stock material and precise cutting of slots of a desired width in a same and additional stock materials, without a need to separately measure for correct slot-width and location, and re-adjustment of a single stop element.

Such operation is illustrated schematically in FIG. 5, where the circular saw disc 10 of the table saw is shown in top plan view and extending through slot 14 in the surface s of table 12. The featherboard 30 is (incorrectly) shown in perspective view rather than plan view, but this is not relevant in this context. Relevantly though, featherboard 30 is magnetically clamped to the saw table surface s, with the stops 72/74 (or rather, the front face 40 of the featherboard 30) at a desired lateral spacing from saw blade 10, dictated by the approximate location of where a cross-cut is to be effected in the stock material 20 which is to be fed positionally held in direction c towards blade 10 using a not-illustrated pushing block. Stop 72 is shown with its abutment piece 76 protruding a distance d2 from the front face 40 of featherboard 30, whereas stop 74 has its abutment piece 76 spaced a smaller distance d1 than that of stop 72. For present purposes it is assumed that lower stop 74 distance d1 has been adjusted so that abutment of stock material against its abutment piece 76 is intended to provide a left-hand edge Le of an intended wider slot to be cut into the stock material 20. Distance d2 can then be set to correspond with the right hand edge Re by adjustment of the abutment piece 76 of upper stop 72 and thus define a gap distance dg. Timber stock material 20 is then first abutted against the lower stop 74 as illustrated in the phantom outline, then moved along direction c whilst maintaining its stop-defined position (the featherboard 30 remains stationary), to make the first cross-cut, then retracted from the saw to be placed with its terminal end against upper stop 72 and then pushed again against the saw 10 to make a second notch parallel with a spacing of dg with respect to the first notch cut; subsequent passes to remove material between the cut notches then creates a groove located between the two axial cut edges Le and Re of the notches.

If for whatever reason the machined groove is undersized for its intended purpose, adjustment of d1, d2 or both can be carried out to widen dg.

While the form of apparatus herein described constitutes a preferred embodiment of this invention, it is to be understood that the invention is not limited to this precise form of apparatus, and that changes may be made therein without departing from the scope of the invention.

REFERENCE SYMBOLS USED IN THE DRAWINGS 10 saw blade
12 saw table
14 blade slot 16 miter slot in support surface s of saw table 12
17 guide/fastening groove in support surface s of saw table 12
18 rip/guide fence
19 rip fence T-groove
20 stock material
22 prior art featherboard
24 fingers/feathers of prior art featherboard 22
26 fastening/clamping screws of prior art featherboard 22
28 adjustment slots in body of prior art featherboard 22
30 improved magnetic featherboard
32 elongate main body part X its being longitudinal axis
34, 36 opposite (width-ward) side faces
38 bottom face
40 axially front face
42 axially rear face
44 top face
46 feathers on side 34
48 feathers on side 36
50, 52 on-off switchable permanent magnet units
54 T-shaped housing of 50/52
55 threaded fastening bores in upper face of 54
56 working (gap) face of magnet unit 50/56
57, 58 cavity in main body part 32 opening towards bottom face 38
59 fastening bolts attaching magnets 50/52 to main body part 32
60 rotatable torque plunger of 50/52
62 actuator knob rotationally fixed to plunger 60
64 through hole for 60
66 rotatable magnet of 50/52
68 axially rear magnet gasket rods
70 axially front magnet gasket rods
72, 74 abutment stops
76 abutment piece of 72/74
78 spindle drive mechanism
80 spindle
82 threaded distal spindle end
84 non-threaded proximal spindle end
85 guide element
86 bearing sleeve
87 through hole in wall at front face 40 of block 32
88 helical compression spring
90 adjustment member/thumb nut

The invention claimed is:

1. An improvement in a magnetic featherboard, the featherboard having: an elongate main body with opposite lateral faces, a bottom face and front and rear faces; a plurality of resiliently deformable feathers arranged at one or both lateral faces of the main body, the feathers extending parallel to each other and angularly with respect to a longitudinal axis of the main body; and at least two, on-off switchable permanent magnets respectively received in one of at least two spaced apart recesses of the main body such that a working face of the respective switchable permanent magnet is present at the bottom face of the main body, the switchable permanent magnets being operative in an on-state to magnetically clamp the featherboard to a support table or a fence of a machine for cutting, routing or performing similar material-removing operations on stock material, the support table/fence having at least one groove formed in a stock-facing surface thereof, the improvement comprising: (i) providing a resiliently deformable friction gasket adjacent the working face of each of the switchable permanent magnets and protruding, in an non-deformed state, a predetermined amount from the bottom face of the main body and the working faces to stand the featherboard on the stock-facing surface of the table/fence, the gaskets deformable through magnetic clamping of the featherboard to the table/fence to an extent wherein abutment of the working faces of the switchable permanent magnets on the stock-facing surface of the table or fence is achieved whilst maintaining gasket engagement at the stock-facing surface, and (ii) selecting a shape and dimensions of the working face of the switchable permanent magnets to have a surface area that is larger by a predetermined amount than the square value of a width of the at least one groove formed in the stock-supporting surface of the support table/fence.

2. An improvement in a magnetic featherboard, the featherboard having: an elongate main body with opposite lateral faces, a bottom face and front and rear faces; a plurality of resiliently deformable feathers arranged at one or both lateral faces of the main body, the feathers extending parallel to each other and angularly with respect to a longitudinal axis of the main body; and at least two, on-off switchable permanent magnets respectively received in one of at least two spaced apart recesses of the main body such that a working face of the respective switchable permanent magnet is present at the bottom face of the main body, the switchable permanent magnets being operative in an on-state to magnetically clamp the featherboard to a support table of a machine for cutting, routing or performing similar material-removing operations on stock material, the improvement comprising at least two adjustable stops at one or both of the front and the rear face of the main body, each said stop comprising an abutment piece displaceable in longitudinal direction relative to the front/rear face, wherein a distance of each of the abutment pieces from the front/rear face is settable independently of each other, the stops operational to provide at least two abutments against which stock material to be machined can be placed when the featherboard is magnetically secured to the table.

3. The improved featherboard of claim 2, wherein each of the at least two adjustable stops comprise a spindle member at one terminal end of which the associated abutment piece is carried.

4. The improved featherboard of claim 3, wherein the spindle member has an externally threaded distal portion and a non-threaded proximal portion with a guide element, the spindle member being received in a respective passageway at the main body with the guide block disposed to allow to and fro movement whilst restraining rotation of the spindle member during said to and fro movement.

5. The improved featherboard of claim 4, wherein each of the at least two adjustable stops further comprise an adjustment member threaded to the threaded distal portion of the spindle and secured in a manner which allows rotation of the adjustment member about an axis of the spindle member but prevents axial displacement along the spindle axis and with respect to the front/rear face of the main body, wherein selective rotation of the adjustment member is operative to change a distance by which the abutment piece stands proud from the front/rear face.

6. The improved featherboard of claim 4, wherein the spindle member comprises a square-head bolt, with the head providing the guide element, and a bearing element securing axially-unrestricted movement and support of the bolt's proximal portion at the main body.

7. The improved featherboard of claim 6, wherein a helical compression spring locates between the bearing sleeve and a rearward facing face of the adjustment member so as to restrict axial movement of the adjustment member as it is rotated.

8. The improved featherboard of claim 5, wherein the adjustment member is one of a knurled thumb nut and a hexagonal nut.

9. The improved featherboard of claim 1, wherein the friction gaskets are devised to partially or fully surround the working faces of the switchable permanent magnets.

10. The improved featherboard of claim 1, wherein the working faces of the switchable permanent magnets have one of a circular, oval or rectangular configuration.

11. The improved featherboard of claim 1, wherein the friction gaskets comprise discrete tubular compressible gasket rods which locate and are respectively fixed in a respective one of four grooves in the bottom face, one said groove respectively adjoining a front and a rear side edge of each of the two cavities in which the switchable permanent magnets are received.

12. The improved featherboard of claim 10, wherein the friction gaskets comprise discrete tubular compressible gasket rods, and the discrete tubular compressible gasket rods have a diameter that ensures, when snuggly fitted into the respective grooves, the rods protrude and stand proud of the plane defined at the bottom face of the main body part, and wherein the gasket rods are made of a friction-enhancing, compressible rubber material and are compressible to an extent that when fully compressed into the respective grooves, they no longer stand proud, but create a substantially continuous planar surface with the working face of the switchable permanent magnets when the latter are turned into an on (magnetized) state when the featherboard is received on the table.

13. The improved featherboard of claim 1, wherein the shape and/or specific dimensions of the working face of the switchable permanent magnets is chosen such that the working face area is one of at least 50% and at least 100% larger than the square of the width of the miter slot of the machine table/fence on which the featherboard is intended to be used.

14. A magnetic featherboard comprising:
a main body with opposite lateral faces, a bottom face, a front face, and a rear face;
a plurality of resiliently deformable feathers arranged on at least one of the lateral faces, the feathers extending nominally parallel to each other and angled relative to a longitudinal axis of the main body;
at least one recess positioned within the bottom face;
at least one switchable permanent magnet received within the at least one recess, and a working face of the permanent magnet is adjacent the bottom face;
a resiliently deformable friction gasket adjacent the working face of each of the at least one switchable permanent magnets, the resiliently deformable friction gasket configured to protrude, in a non-deformed state, a predetermined amount from the bottom face of the main body, and the resiliently deformable gasket further configured to deform through magnetic clamping of the featherboard; and
at least two adjustable stops positioned on at least one of the front and the rear face of the main body, the adjustable stops each comprising an abutment piece longitudinally displaceable.

15. The improved featherboard of claim 6, wherein the bearing element is a bearing sleeve.

* * * * *